United States Patent
Matselyukh

(10) Patent No.: US 10,917,420 B2
(45) Date of Patent: Feb. 9, 2021

(54) ANOMALY DETECTION IN A DATA STREAM

(71) Applicants: OPT/NET B.V., Bergen (NL); Taras Matselyukh, Bergen (NL)

(72) Inventor: Taras Matselyukh, Bergen (NL)

(73) Assignee: OPT/NET B.V., Bergen (NL)

( * ) Notice: Subject to any disclaimer, the term of this patent is extended or adjusted under 35 U.S.C. 154(b) by 205 days.

(21) Appl. No.: 15/771,574

(22) PCT Filed: Oct. 31, 2016

(86) PCT No.: PCT/EP2016/076213
§ 371 (c)(1),
(2) Date: Sep. 21, 2018

(87) PCT Pub. No.: WO2017/072356
PCT Pub. Date: May 4, 2017

(65) Prior Publication Data
US 2019/0124099 A1      Apr. 25, 2019

(30) Foreign Application Priority Data
Oct. 29, 2015   (NL) ...................................... 2015680

(51) Int. Cl.
| | |
|---|---|
| *H04L 29/06* | (2006.01) |
| *H04L 12/24* | (2006.01) |
| *G06F 21/56* | (2013.01) |
| *H04L 12/26* | (2006.01) |

(52) U.S. Cl.
CPC ........ *H04L 63/1425* (2013.01); *G06F 21/566* (2013.01); *H04L 41/0622* (2013.01); *H04L 41/142* (2013.01); *H04L 41/16* (2013.01); *H04L 43/16* (2013.01); *H04L 63/1416* (2013.01); *H04L 63/1458* (2013.01)

(58) Field of Classification Search
None
See application file for complete search history.

(56) References Cited

U.S. PATENT DOCUMENTS

| | | | |
|---|---|---|---|
| 2003/0145232 A1* | 7/2003 | Poletto ................ | H04L 63/1408 726/22 |
| 2004/0261030 A1 | 12/2004 | Nazzal | |
| 2006/0161984 A1* | 7/2006 | Phillips ................. | G06F 21/564 726/24 |
| 2007/0283436 A1 | 12/2007 | Duffield et al. | |

(Continued)

FOREIGN PATENT DOCUMENTS

EP        2785009        10/2014

*Primary Examiner* — Taghi T Arani
*Assistant Examiner* — Joshua Raymond White
(74) *Attorney, Agent, or Firm* — Steven M. Greenberg, Esq.; Shutts & Bowen LLP

(57) ABSTRACT

There is provided a method for detecting an anomaly in plurality of data streams originating from a system or network of systems. Data streams are collected from the system or systems and divided into a plurality of time intervals. For each of the plurality of time intervals, a value for a parameter associated with the data stream is determined. A deviation in the determined values is calculated for the parameters associated with the data stream from expected values for the parameters and, if the calculated deviation is above a threshold, an anomaly is detected in the collected data stream.

8 Claims, 7 Drawing Sheets

(56) References Cited

U.S. PATENT DOCUMENTS

| | | |
|---|---|---|
| 2012/0173710 A1 | 7/2012 | Rodriguez |
| 2012/0278890 A1* | 11/2012 | Maatta ................ H04L 63/1425 |
| | | 726/23 |
| 2014/0090053 A1 | 3/2014 | Simske et al. |
| 2014/0283074 A1* | 9/2014 | Sohn ................... H04L 63/1416 |
| | | 726/23 |
| 2015/0020199 A1* | 1/2015 | Neil .................... H04L 63/1425 |
| | | 726/23 |
| 2016/0156644 A1* | 6/2016 | Wang ................. H04L 63/0236 |
| | | 726/23 |

* cited by examiner

ANOMALY DETECTION IN A DATA STREAM

TECHNICAL FIELD

The present invention relates to a method and apparatus for detecting an anomaly in a data stream originating from a system. The system may be a network or any other complex system or device.

BACKGROUND

Human error, such as an operator's lack of knowledge and understanding of aspects of near real-time operations of large complex critical infrastructures remains the main risk to the security and safe operations of complex networked environments at service providers. Failure to protect services from the effects of intentional or unintentional negative malicious influences from inside or outside the system results in loss of revenue and property, and in some extreme cases may lead to the demise of a business.

State of the art solutions for defence from cyber attacks (such as distributed Denial of Service, dDoS, attacks) rely on the deployment of data flow collectors in the system. The data flow collectors statistically sample network traffic on a segment of the network. Further processing traffic involves establishment of a baseline (i.e. 'normal') signal, which is date and time dependent. Current algorithms generally use Fourier transforms to establish a baseline.

In particular, Fourier transforms are used to convert a time-series signal into its constituent frequency components. Stochastic components and anomalies are usually represented by the low-energy frequency components. Therefore, by only considering high frequency components in the Fourier frequency domain, anomalies can be removed, leaving a baseline signal. When a deviation from the baseline is detected by monitoring systems, the target Internet Protocol (IP) address of the victim is determined and the traffic to the IP address of the victim is scrubbed (i.e. diverted) to a special dDoS scrubbing centre. For example, all traffic to the victim is sent to a destination sinkhole located in the scrubbing centre and is therefore irretrievably lost.

These solutions are limited in that it the use of Fourier transforms to calculate the baseline necessitates that the baseline is calculated over a reasonable time interval (for example, around 15 minutes) for accurate results. This results in a significant amount of time (for example, 10-15 minutes or longer) before network traffic anomalies are detected. It also means that while the existing solution may be suited to the detection of long duration anomalies, the existing solutions lack the resolution to detect shorter duration anomalies.

Furthermore, the fact that traffic to the IP address of the victim is diverted to a sink hole means that server public IP addresses are temporarily unreachable due to 'black-hole' effects of the dDoS scrubbing policies. The victim of the attack is thus prevented from using their public IP addresses until the cyber attack stops and the black-hole route is removed. This may also impact other users, who share the same parts of the network or are on the same IP address block. Moreover, the existing systems are complex and expensive to implement.

Similar principles apply to operations telemetry generated by the IT servers, routers, switches, firewalls and other network infrastructure elements. In this later case other non-structured data formats should be used for timely detection of the oncoming incidents.

Generally, there is a need for an improved anomaly detection apparatus and method that can reduce the number of false positive detections (i.e. false alarms where the traffic is in fact normal traffic) whilst also improving the overall detection rate to ensure a higher proportion of true anomalies are detected.

SUMMARY

It is an object of the invention to obviate or eliminate at least some of the above disadvantages and provide an improved method and apparatus for detecting an anomaly in a data streams originating from a single system or network of systems as quickly as possible, e.g. in seconds rather than minutes.

According to an aspect of the invention, there is provided a method for detecting an anomaly in plurality of data streams, comprising structured, unstructured and/or hybrid data, originating from a system or network of systems, the method comprising: collecting such data streams from the system or systems; dividing the collected data streams into a plurality of time intervals; for each of the plurality of time intervals, determining a value for a parameter associated with each data stream; for each of the plurality of time intervals, determining a respective expected value for the parameter, wherein the expected value comprises a median value of the parameter during a respective time segment, wherein each time segment comprises a plurality of adjacent time intervals; for each of the plurality of time intervals, calculating a deviation in the determined value for the parameter associated with the data stream from the expected value for the parameter; and if the calculated deviation is above a threshold, detecting an anomaly in the collected data streams.

According to an aspect of the invention, there is provided an apparatus for detecting an anomaly in a data stream originating from a system, the apparatus comprising: a collector module operable to collect a plurality of data streams from at least one system; a profiler module operable to divide the collected data streams into a plurality of time intervals, determine a value for a parameter associated with each data stream for each of the plurality of time intervals and calculate a deviation in the determined values for the parameters associated with the data streams from expected values for the parameters, wherein the expected value comprises a median value of the parameter during a respective time segment, wherein each time segment comprises a plurality of adjacent time intervals; and a processor operable to detect an anomaly in the collected data streams if the calculated deviation is above a threshold.

According to an aspect of the invention, there is provided a method for detecting an anomaly in data streams originating from a system or network of systems, the method comprising: collecting a data stream from the system, wherein the collected data stream comprises unstructured data and/or structured data and/or hybrid structured/unstructured data; dividing the collected data stream into a plurality of time intervals; for each of the plurality of time intervals, determining a value for a parameter associated with the data stream, wherein, when the collected data stream comprises unstructured data, determining the value for the parameter comprises following rules for the translation of unstructured data to parameter values; calculating deviations in the determined values for the parameters associated with the data streams from expected values for the parameters; and if a calculated deviation is above a threshold, detecting an anomaly in the collected data stream.

According to an aspect of the invention, there is provided an apparatus for detecting an anomaly in a data stream originating from a system, the apparatus comprising: a collector module operable to collect a data stream from at least one system, wherein the collected data stream comprises unstructured data and/or structured data and/or hybrid structured/unstructured data; a profiler module operable to divide the collected data stream into a plurality of time intervals, determine a value for a parameter associated with the data stream for each of the plurality of time intervals and calculate a deviation in the determined values for the parameters associated with the data stream from expected values for the parameters, wherein, when the collected data stream comprises unstructured data, determining the value for the parameter comprises following rules for the translation of unstructured data to parameter values; and a processor operable to detect an anomaly in the collected data stream if the calculated deviation is above a threshold.

According to an aspect of the invention, there is provided a method for detecting an anomaly in a data stream originating from a system. A data stream is collected from the system. The collected data stream is divided into a plurality of time intervals. For each of the plurality of time intervals, a value for a parameter associated with the data stream is determined. A deviation in the determined values for the parameters associated with the data stream from expected values for the parameters is determined. If the calculated deviation is above a threshold, an anomaly in the collected data stream is detected.

According to another aspect of the invention, there is provided an apparatus for detecting an anomaly in a data stream originating from a system. The apparatus comprises a collector module operable to collect a data stream from a system. The apparatus also comprises a profiler module operable to divide the collected data stream into a plurality of time intervals, determine a value for a parameter associated with the data stream for each of the plurality of time intervals and calculate a deviation in the determined values for the parameters associated with the data stream from expected values for the parameters. The apparatus also comprises a detector module operable to detect an anomaly in the collected data stream if the calculated deviation is above a threshold.

According to another aspect of the invention, there is provided a computer program product, comprising a carrier containing instructions for causing a processor to perform the method.

In this way, the invention provides an improved method of detecting an anomaly in a data stream that reduces the number of false positive detections (i.e. false alarms where the traffic is in fact normal traffic) and improves the overall detection rate to ensure a higher proportion of true anomalies are detected.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Figure 1:
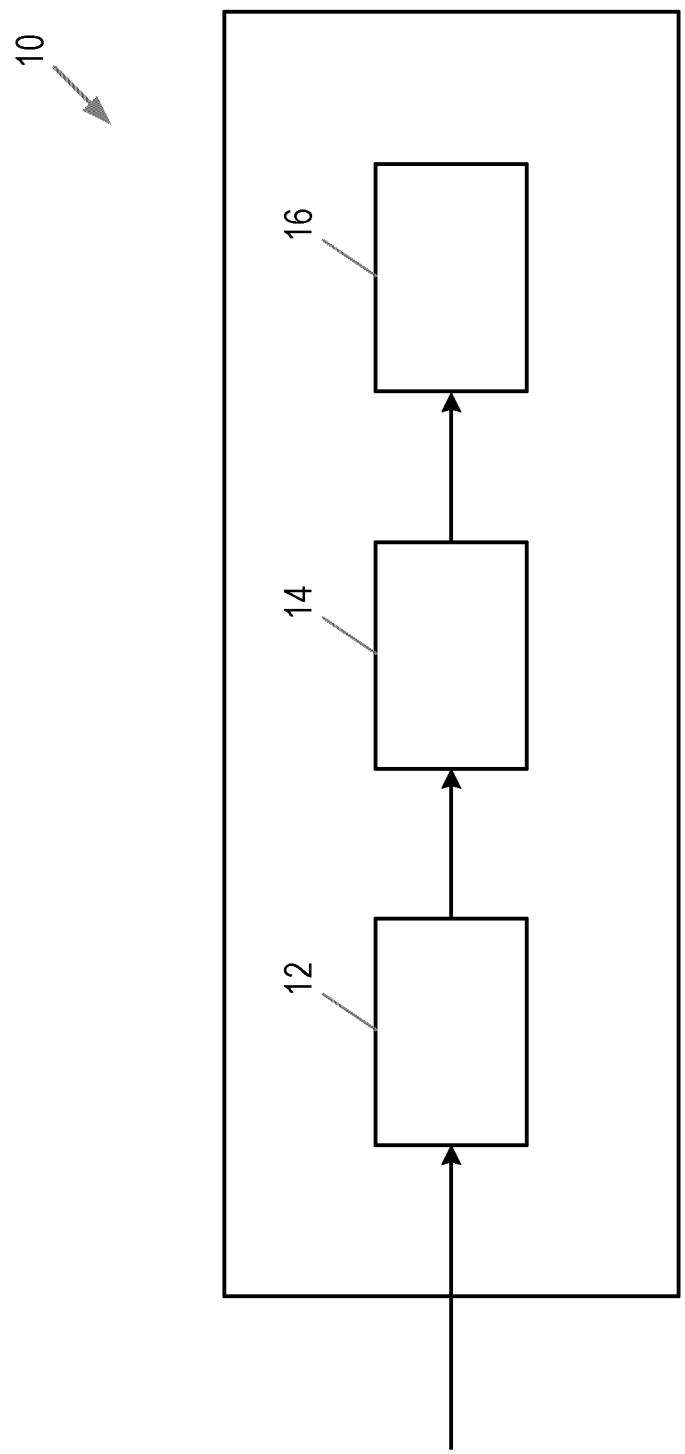
FIG. 1 is a block diagram illustrating an apparatus for detecting an anomaly in a data stream originating from a system in accordance with the invention.

FIG. 1 illustrates an apparatus 10 for detecting an anomaly in a data stream originating from a system in accordance with the invention. The apparatus 10 comprises a collector module 12 operable to collect a data stream from a system, a profiler module 14 operable to divide the collected data stream into a plurality of time intervals, and a detector module 16 operable to detect whether an anomaly is present in the collected data stream. In some embodiments, the apparatus 10 may comprise a plurality of collector modules 12 and profiler modules 14. In some embodiments, the detector module 16 may consist of multiple parts configured to implement various anomaly detection and recognition algorithms and to store Artificial Intelligence (AI) or machine knowledge data-packs (such as machine learned rules for application to collected data).

The system from which the data stream originates may be a network or any other complex system or device from which a data stream can be collected. For example, the system may be a server, a Local Area Network (LAN), a Personal Area Network (PAN), a Wide Area Network (WAN), a Wireless Local Area Network (WLAN), a Virtual Private Network (VPN), the Internet, a smart electricity grid, a SmartPlant®, a traffic and transport control system or any other complex system.

Figure 2:
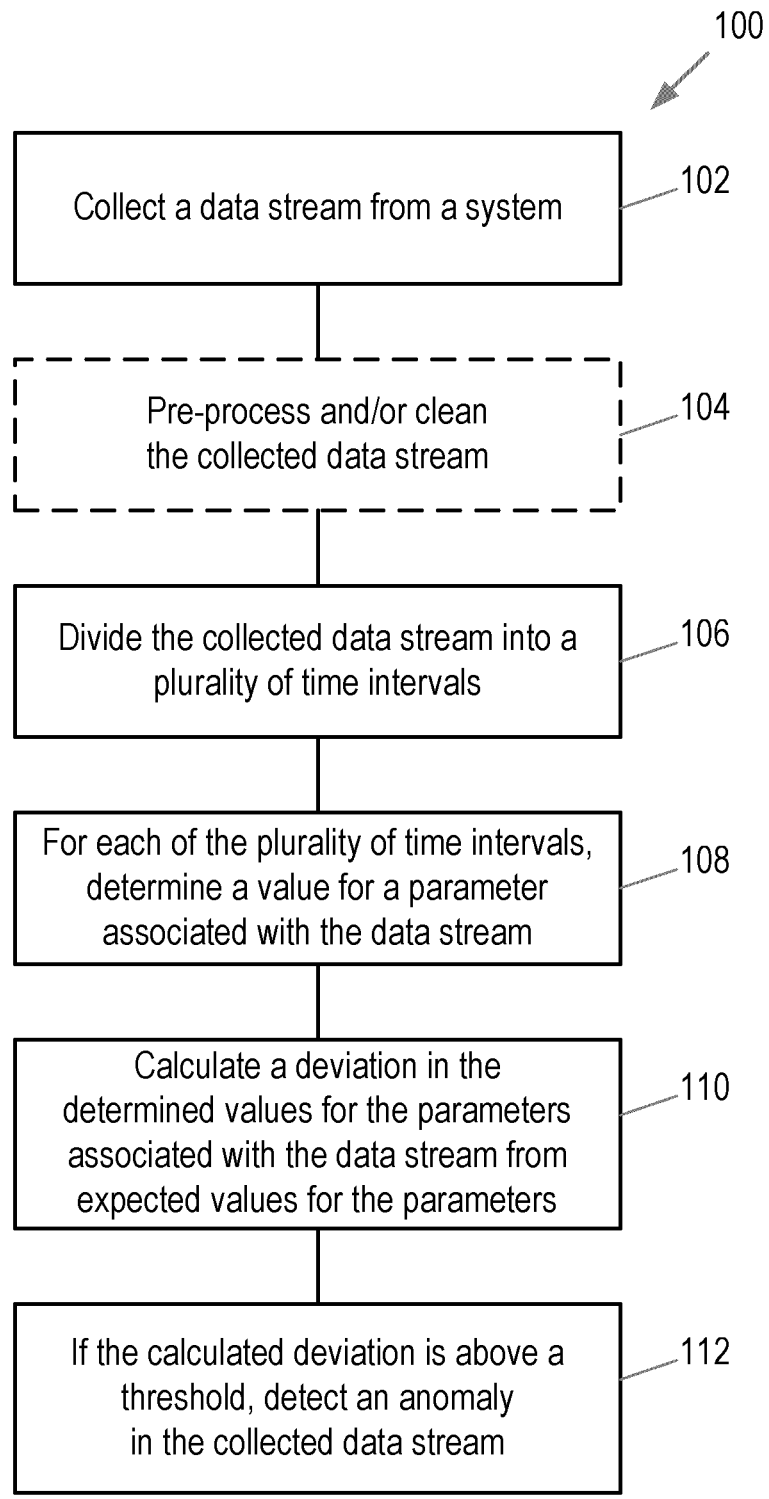
FIG. 2 is a flow chart illustrating a method in accordance with an aspect of the invention.

FIG. 2 is a flow chart illustrating a method 100 in accordance with the invention.

With reference to FIG. 2, at block 102, the collector module 12 is operable to collect a data stream from a system. The collector module 12 is operable to collect the data stream from the system in real time or at least near-real time.

The data stream from the system may be, for example, a data stream from a network or a complex system such as a server, a Local Area Network (LAN), part of the Internet, or any other complex system such as those described above. The data stream may comprise any type of data from the system including structured data and/or unstructured data.

Structured data may be, for example, organised data or data having an associated pre-defined data model to organise and/or standardise the data. Examples of structured data include non-verbal data of any type such as numerical or statistical data. For example, structured data may comprise time series values, system performance or utilisation data (such as data corresponding to a Central Processing Unit, CPU), which may be represented by Simple Network Management Protocol Object Identifier (SNMP OID) readings, or which may be in the form of formatted raw statistics files or acquired by means of other standard data collection protocols. The files may be formatted, for example, using the American Standard Code for Information Interchange (ASCII) or any other formatting standard or protocol.

Unstructured data may be, for example, data lacking an associated pre-defined data model to organise and/or standardise the data. Examples of unstructured data include text-heavy data, which may also contain data such as dates, numbers, facts, or any other form of human-readable data. For example, unstructured data may include time-stamped data such as system data logs (syslogs), access logs, firewall logs, call data records, alarms (for example, Simple Network Management Protocol (SNMP) traps), Simple Network Management Protocol (SNMP) data, or the like.

The collected data may be time-stamped data (i.e. the data may have an origin time-stamp) or the collector module 12 may be operable to time-stamp the collected data (i.e. the data is provided with an internal or local time-stamp). In one example, the data is time-stamped with a date and/or time format, which may be of any type (for example, DD-MM-YYYY, HH:MM:SS:ms, or any other type). The time-stamp may be an epoch time-stamp.

Other sources of digital or analogue data collected by the collector module 102 may also be processed.

In some embodiments, the method may optionally comprise pre-processing and/or cleaning of data from the collected data stream (block 104 of FIG. 2). This may take place at the collector module 12. The collector module 12 may pre-process and/or clean the data from the collected data stream by comparing the collected data with a pre-defined knowledge model of the system from which the data is collected. The pre-defined knowledge model may be represented by rules written by an operator of the system.

The collected data stream comprises a plurality of data values, each of which may represent an event occurring in the system from which the data stream is collected. At block 106 of FIG. 2, the profiler module 14 is operable to divide the collected data stream into a plurality of time intervals. For example, the events occurring in the system may be organised by the time interval in which the event occurs. The size of the time interval is flexible and may be set by an operator. In one example, the data within a time interval is processed to obtain a data point, which may be plotted against time. The data points may be stored in a database. The database may be internal to the apparatus 100 or may be an external database.

The time interval defines the duration of time for which collected data is processed and a data point determined. The time interval may be an arbitrary value (for example, expressed in seconds or milliseconds). In one example, the time interval is chosen by the operator based on the urgency for anomaly detection (for example, close to real time) and/or the system hardware capabilities (for example, a value chosen that allows the collected data to be processed without causing back-logging, buffering, crashing, or the like).

The profiler module 14 may process a set number of adjacent time intervals for anomaly detection. The set number of time intervals is referred to as a time segment and the size of the segment is defined by a radius parameter. The result of the data processing of each time interval within the segment is taken into account for anomaly detection.

The size of the time segment is calculated using the following equation:

Time segment=(Radius parameter×2)+duration of time interval.

In one example, the radius parameter is set to 2 and each time interval is set to have a duration of 1 second. For a radius parameter of 2 and a time interval having a duration of 1 second, the size of the time segment is calculated as: (2×2)+1=5 seconds. This provides five points of data (i.e. a data point for each of five adjacent time intervals) for processing and analysis at any given time.

In other examples, the time interval may be selected to have a duration of 100 ms, 1 s, 5 s, 1 minute or any other time interval duration. The chosen time interval defines the resolution and the radius parameter determines how rapidly the system can detect anomalous system behaviour.

At block 108 of FIG. 2, for each of the plurality of time intervals, the profiler module 14 is operable to determine a value for a parameter associated with the data stream.

In one example, the profiler module 14 detects an occurrence of zero or more events in the time interval and determines a value for a parameter associated with the data stream in the time interval by assigning a severity value based on the detected occurrence of the zero or more events in the time interval.

In another example, the profiler module 14 detects an occurrence of a plurality of events in the time interval, assigns a severity value to each of the plurality of events and determines a value for a parameter associated with the data stream in the time interval by calculating the sum of the assigned severity values. In other words, the parameter is determined as a total severity, $S_{TOT}$, which is the sum of the individual severities (i.e. enumerated values) of the events occurring in each time interval.

In another example, the profiler module 14 detects an occurrence of a plurality of events in the time interval and determines a value for a parameter associated with the data stream in the time interval based on a count of the number of detected events occurring per second in the time interval or a count of the number of events logged per time interval.

In another example, for a plurality of time stamps within the time interval, the profiler module 14 analyses data comprised in the data stream to detect an event and assigns a severity value based on the detected event. The profiler module 14 determines a value for a parameter associated with the collected data stream by calculating the sum of the assigned severity values at the plurality of time stamps within the time interval unit.

In any of the above examples, the event may be a trigger word or a value.

A detected event is classified and enumerated according to pre-determined model rules, which can be expressed in the form of consecutive <if-then> procedures or rules. In this way, the profiler module 14 is able to translate and process unstructured data as well as structured data.

The exact rules for the translation of the unstructured data to the severity values (i.e. the enumeration of the event data as discussed above) depend on knowledge of previous behaviour and of expected behaviour of the system from which the data stream is collected and may be vendor and technology specific. For example, an operator may create the <if-then> rules for translation of event data into parameter values (such as severity values) and trigger action scripts. The collection of such rules and action scripts may be provided as part of a machine knowledge data-pack, which can be installed in the system to address particular deployment scenarios.

Where the event is recognized by a key trigger word present in the text values or numerical value exceeding a certain threshold, the enumeration may comprise mapping particular strings to particular numerical values, or where the event is a trigger value, the enumeration may comprise mapping one number to another. For example, events containing the word 'error' may be assigned a particular value (e.g. 50), whilst events containing the word 'warning' may be assigned another value (e.g. 10). Any significant events, even those having verbal expressions in the system logs, are decoded and assigned an appropriate value. The enumerated values are referred to herein as the 'severity' value of the event. Although examples have been provided for the case where the events are trigger words or values, it will be appreciated that the data stream may be enumerated based on any other characteristics (for example, another characteristic may be the CPU usage or traffic throughput of the data interface). The events are analysed in the manner explained above to provide an indication of whether an error has occurred in the system, whether there is a problem in the system, whether there is any cause for concern, etc.

The determined severity values, in effect, provide a severity data series (which may also be referred to as a severity function) and the values may be plotted (for example, in a plot of event numbers) in real time or via historical representation dashboards. In this case the severity function is equivalent to a structured data function. The function may be any kind of function such as monotone, non-monotone, continuous, non-continuous, digital, binary, etc. Generally, the severity function is a stochastic function and is unpredictable due to the nature of the system from which the data stream is collected.

Once a value for a parameter associated with the data stream is determined for each of the plurality of time intervals as described above (at block 108 of FIG. 2), the process moves to block 110. At block 110 of FIG. 2, the profiler module 14 is operable to calculate a deviation in the determined values for the parameters associated with the data stream from expected values for the parameters. The expected values are obtained automatically by the profiler module 14. The expected values for the parameter may be values obtained from a database of expected values characteristic for a model of the managed system.

The expected value may be the median value of the parameter in the time segment. For example, the profiler module 14 may monitor the series of data in the data steam for the system and use statistical analysis to calculate the expected value as the median value of the data series in each time segment. Thus, the profiler module 14 establishes the expected values and calculates the deviation in the determined values from the expected value for each of the time intervals within the latest time segment.

This allows detection of changes (including rapid, significant and unexpected changes) in the data series by calculation of the deviation from expected values, which can be made in near real time. In other words, the profiler module 14 is able to detect deflections from the norm (i.e. median, mean or other statistically defined values).

In some embodiments, of the profiler module 14 may calculate a deviation in the determined values for the parameters associated with the data stream by, for each time interval, calculating the expected value for the parameter (as described above) within a time interval of the time segment and comparing it to the determined value for the parameter in that time interval to calculate the deviation of the parameter value from the expected value.

As mentioned above, the data series may be a severity data series (i.e. the severity function) for the system. In one example, the expected value may be a representative average value (such as the mean or median value) of the total severity $S_{TOT}$ over the series of values in a time segment.

In one embodiment, the expected value for a parameter in a time interval is calculated as the median value of the parameter in the time interval. In other words, the expected value for a parameter may be calculated as the middle value for the parameter when the parameter values are in order, i.e. the value that separates the higher half of a data sample from the lower half of the data sample.

For example:
the median of $\{2, 3, 5, 9, 12\}$ is 5;
the median of $\{2, 8, 16, 9, 11\}$ is 9;
the median of $\{1, 3, 0, 9, 4\}$ is 3.

The median value may be calculated by first sorting the data sample (for example, the event counts, values, or severity values) in numerical order and then determining the median value, which is the central element in the sorted data sample.

The use of the median of a small number (for example five as illustrated above, or three, seven, nine, or eleven) of recent sample values to form the expected value has the advantage that it can be generated quickly and with low computational requirements, but provides a good first step in recognition of anomalies.

Once an expected value has been calculated by any of the above examples, a deviation in the determined values of the parameters associated with the data stream (for example, in the total severity or total count) from expected values is calculated. The measure of the deviation is made in the same time segment for the central element and is the value of the central element in the time segment when the data is sorted.

There are a number of possible deviation measurements that can be used, including but not limited to the following examples.

In one example, an uncorrected sample deviation (SD) may be used based on the median expressed in absolute values. In other words, the uncorrected sample standard deviation formula is used as a basis, with the median value used instead of the mean value. This formula may be expressed as:

$$SD = \sqrt{\frac{1}{N} \sum_{i=1}^{N} (x_i - \underline{x})^2}$$

where $x_i$ are the observed values for the collected data (i.e. the parameter values, such as the event count values or the event severity values, in the time interval) and $\underline{x}$ is the median value for the collected data in the time interval, while the denominator N is the size of the sample of data collected (which is calculated as the square root of the sample variance, where the sample variance is the average of the squared deviations about the sample mean).

In another example, a corrected sample deviation may be used based on the median expressed in absolute values. The formula for the corrected sample deviation may be expressed as:

$$SD = \sqrt{\frac{1}{N-1} \sum_{i=1}^{N} (x_i - \underline{x})^2}$$

where, $x_i$ are the observed values for the collected data (i.e. the parameter values, such as the event count values or the event severity values in the time interval) and $\underline{x}$ is the median value for the collected data in the time interval, and N is the size of the sample of data collected (which is calculated as the square root of the sample variance, where the sample variance is the average of the squared deviations about the sample mean).

In another example, an unbiased sample deviation may be used based on the median expressed in absolute values. The formula for the unbiased sample deviation may be expressed as:

$$SD = \sqrt{\frac{1}{N-1.5}\sum_{i=1}^{N}(x_i - \underline{x})^2}$$

where $x_i$ are the observed values for the collected data (i.e. the parameter values, such as the event count values or the event severity values in the time interval) and $\underline{x}$ is the median value for the collected data in the time interval, while the denominator N is the size of the sample of data collected (which is calculated as the square root of the sample variance, where the sample variance is the average of the squared deviations about the sample mean).

Other examples of the deviation measurements that can be used include:
1. Uncorrected standard deviation expressed in percentages of mean;
2. Corrected standard deviation expressed in percentages of mean;
3. Unbiased standard deviation expressed in percentages of mean;
4. Uncorrected standard deviation expressed in absolute values;
5. Corrected standard deviation expressed in absolute values;
6. Unbiased standard deviation expressed in absolute values;
7. Derivative expressed in absolute values;
8. Absolute difference F between median M and base signal B, i.e. F=(B−M);
9. Prorated (relative) difference between median and base signal expressed as a percentage, i.e. F=(B−M)/B*100;
10. Uncorrected standard deviation based on median expressed in absolute values;
11. Corrected standard deviation based on median expressed in absolute values;
12. Unbiased standard deviation based on median expressed in absolute values.

However, the deviation measurements are not limited to the above examples and any other deviation measurement may also be used.

At block 112 of FIG. 2, if the calculated deviation is above a threshold (also referred to as a deviation threshold), the detector module 16 is operable to detect an anomaly in the data stream. The threshold may be set manually or may be determined automatically. In response to detecting an anomaly, the detector module 16 may review the collected data stream to verify the data comprised in the data stream. The anomaly may be analysed and classified through a pattern recognition technique. In other words, a classification is determined for the anomaly.

For example, the detector module 16 may compare the detected anomaly (or the data obtained for the anomaly such as the deviation function) with at least one anomaly stored in a database of anomalies. The database of anomalies may store data obtained for known or previously identified anomalies. The database of anomalies may be a database created through machine learning of previously detected anomalies, operator classification of anomalies and/or user input of anomalies.

The comparison of the detected anomaly with at least one stored anomaly may involve the detector module 16 determining a measure of the similarity between the detected anomaly and the at least one anomaly stored in the database of anomalies. The detector module 16 may determine a detected anomaly to be similar to the at least one anomaly stored in the database of anomalies where the divergence between the detected anomaly and the at least one anomaly stored in the database of anomalies is less than a predetermined threshold (also referred to as a divergence threshold).

If the divergence between the detected anomaly and the at least one anomaly stored in the database of anomalies is more than the predetermined threshold, the detector module 16 adds the detected anomaly to the list of unknown (not yet classified) anomalies. Otherwise, the detector module 16 determines a classification for the detected anomaly.

Once classified, the detector module 16 may assign an action to the detected anomaly. In response to detecting an anomaly, the detector module 16 may implement a mitigation technique to mitigate a source (or root cause) of the anomaly. The mitigation technique may include blocking access from a source of the anomaly, redirecting the collected data stream back toward a source of the anomaly and/or discarding traffic from a source of the anomaly. In one example, the action assigned to a detected anomaly may include sending a notification to an operator of the system from which the data stream is collected. In another example, an action script may be run automatically for the anomaly or the anomaly may be notified to the system by a notification message, which may include an action script for the system to run for the anomaly.

For example, the anomaly may be notified to an operator of the system via SMS, e-mail or the like. The anomaly may be the result of interface flapping and the action script may then notify operators of an action script to run to resolve or counteract interface flapping. In another example, the anomaly may be classified as a known cyber threat and an action script to mitigate that cyber threat may be run automatically. For example, firewall rules may be applied that block the source (i.e. the root cause) of a dictionary password pickup routine. An operator of the system may also be notified of the anomaly in this example.

Where an anomaly is detected, the detected anomaly may be stored in a database of anomalies. The database may be internal to the apparatus 10 or may be an external database of anomalies.

On the other hand, if the calculated deviation is below the threshold, no anomaly is detected in the data stream (i.e. the data stream appears normal or within expected parameters).

The deviation threshold is an arbitrary parameter and depends on the rules of the chosen system model. The rules may be created in such a way that false positive anomaly detections are minimised but the sensitivity is adequate to detect important system behaviours. The rules may be adapted at any time. For example, in the case of assigning severity values to trigger words or trigger values that may be present in a collected data stream, the rules can be adjusted by mapping different severity values to different words or values in order to amplify certain events and desensitise other events. For example, if the least significant event is defined with the word 'warning' that is represented with the severity value of 100 and the aim is to detect this word as an anomaly, the threshold may be at least equal to the value of 100. Alternatively, if an event of lesser severity is signified with the word 'info' that is represented with the severity value of 10, then the threshold may be set such that a single, double or even triple occurrence of the word would not be significant enough to detect an anomaly, but if 10 or more occurrences of the word occur within a time interval, an anomaly is detected. In this way, less significant anomalies are detected if the number of occurrences of an event exceeds the threshold. It is also possible to ignore certain events. The deviation threshold may be predetermined (for example, set manually) or defined automatically based on statistical analysis or other mathematical operations that may adapt the deviation thresholds based on the circumstances.

By determining whether the calculated deviation is above a threshold, it is possible to detect whether an anomaly is present in the collected data stream. The calculated deviation provides an indication of whether an error has occurred in the system, whether there is a problem in the system, whether there is any cause for concern, etc.

In some examples, the profiler module 14 plots the expected values for the parameter associated with the data stream, the determined values for the parameter associated with the data stream (i.e. the actual values for the parameter) and the deviation of the determined values from the expected values over time. The plot of the deviation over time may be referred to as the deviation function.

Figure 3:
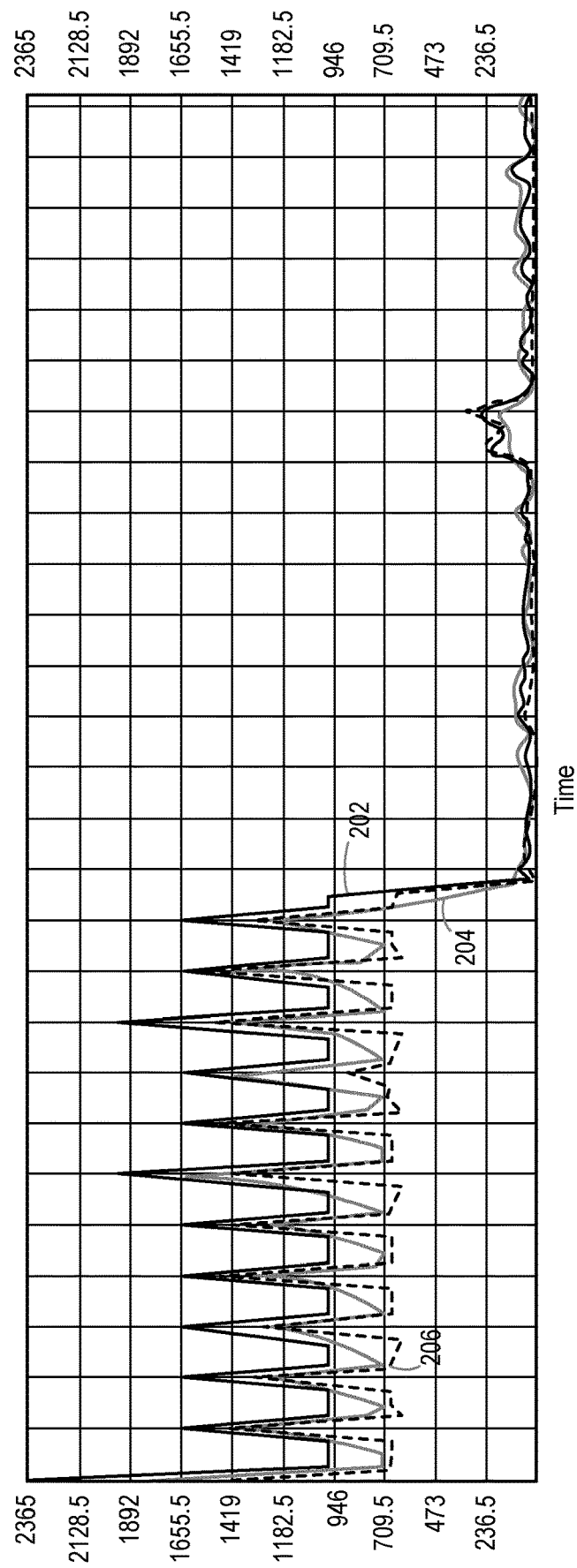
FIG. 3 is a graph of example expected values and a deviation function for a data stream calculated according to an embodiment of the invention, where no anomaly is detected.

FIG. 3 shows an example of a deviation plotted with respect to time (i.e. a deviation function). The deviation function has a duration, a shape representative of a waveform and a maximum amplitude. In FIG. 3, the determined values for the parameter associated with the data stream over time is illustrated by line 202, the expected values by line 204 and the deviation from those expected values by line 206.

Referring back to FIG. 2, at block 112, any significant amplitude value of the deviation function that exceeds a pre-determined threshold level may signify an anomaly of the measured parameter. In this illustration, there is no anomaly detected.

Figure 4:
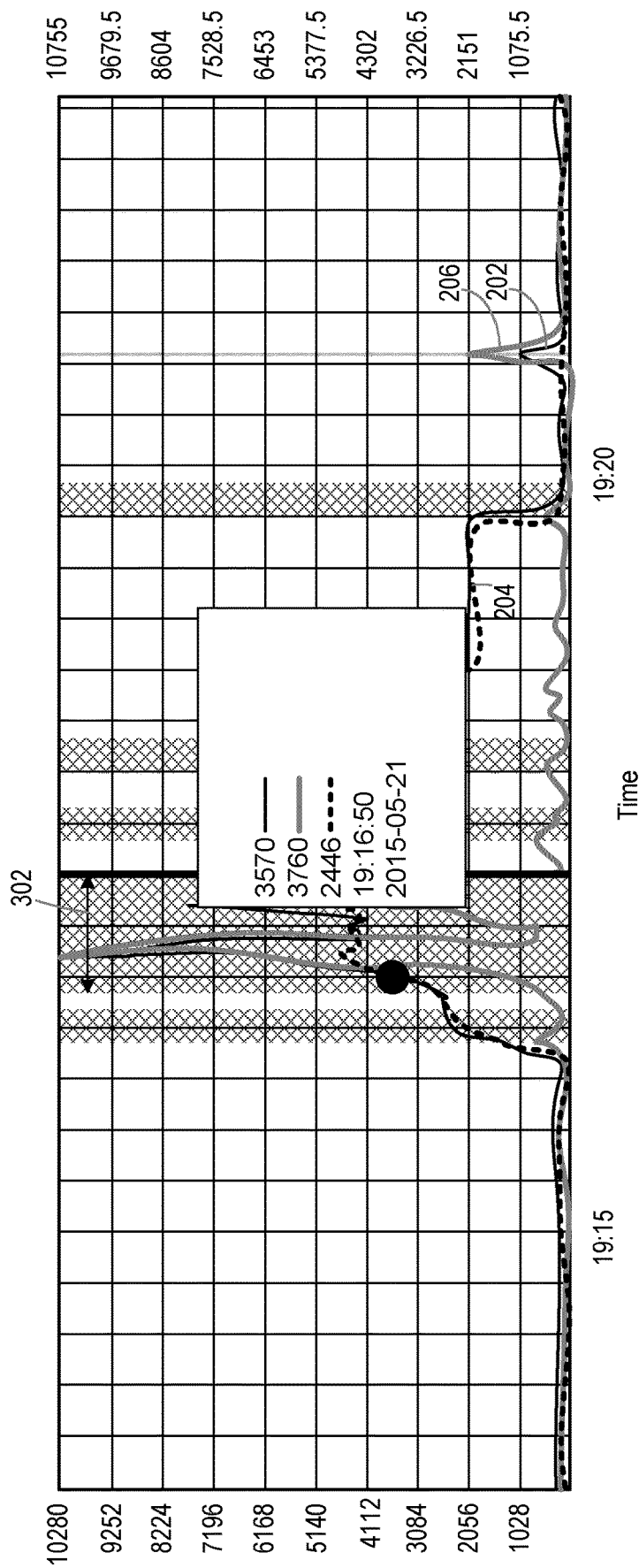
FIG. 4 is a graph of another example expected values and a deviation function for a data stream calculated according to an embodiment of the invention, where an anomaly is detected.

FIG. 4 shows another example of a deviation plotted with respect to time (i.e. a deviation function). The example illustrates the severity function 202, the expected value for the severity function 204 (which in this example is the median value) and the deviation from the expected value 206. The severity function 202 and the expected value for the severity function 204 are calculated by the profiler module 14 in step 108 of FIG. 2. The deviation from the expected value 206 is calculated by the profiler module 14 in step 110 of FIG. 2. In this illustration, an anomaly is detected in the region of the plot marked 302.

Figure 5:
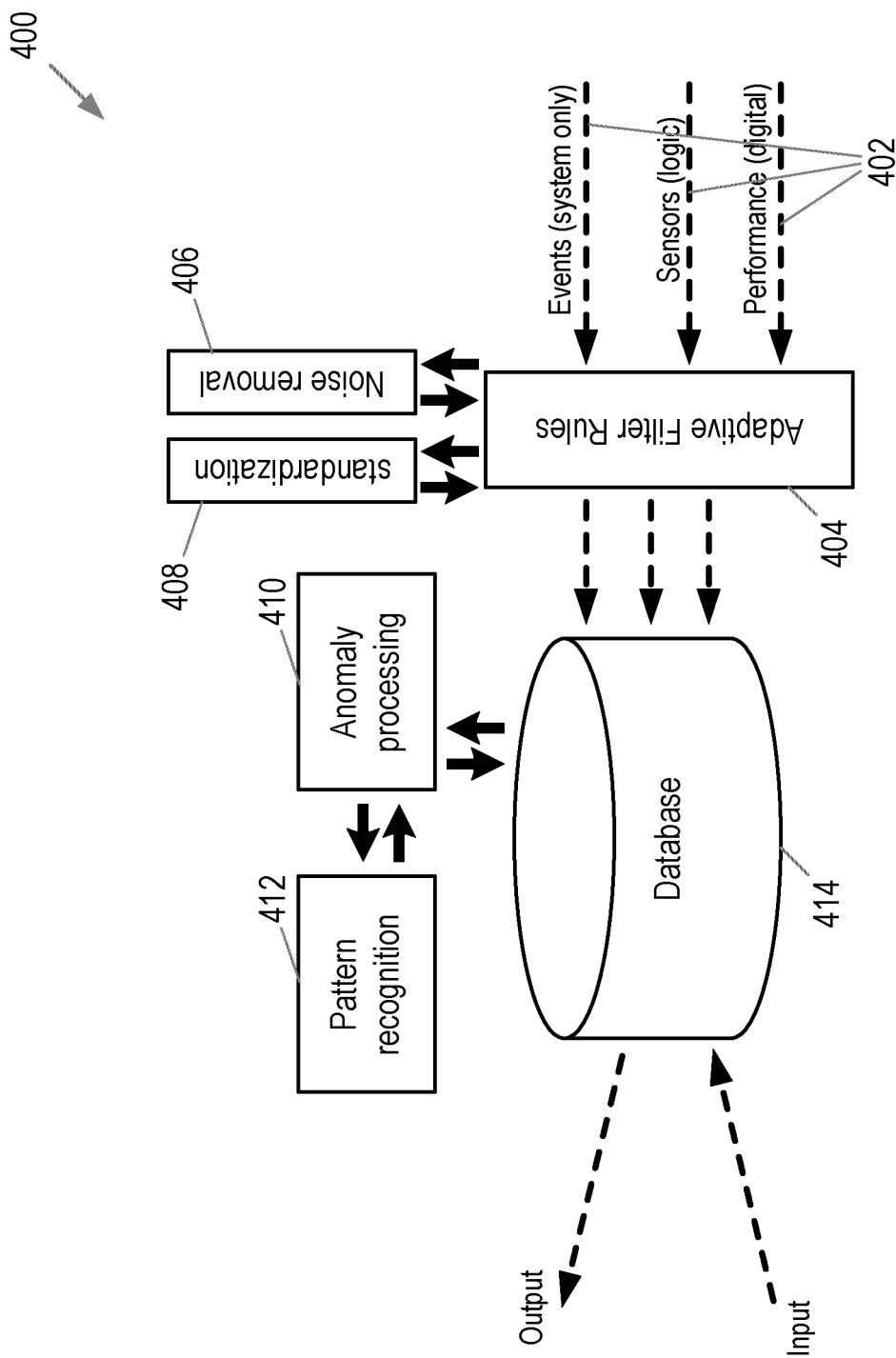
FIG. 5 is a block diagram illustrating an example system in which the invention may be implemented.

FIG. 5 shows a schematic representation of an example system 400 in which the apparatus 10 and method described above may be implemented.

Starting on the right hand side of FIG. 5, data 402 is collected at a collector module 404 (block 102 of FIG. 2). The data comprises a plurality of data streams 402, and each data stream may comprise structured, unstructured and/or hybrid (i.e. a mix of structured and unstructured) data, and the streams may comprise the same type of data or different types, that is they may be homogeneous or heterogeneous. The data may originate from a single system or from a network of systems. In this example, the data includes a set of events, sensor readings and/or performance data. In some examples, the data is generated, and then received by the system 400 live, and then processed in near real-time. In other examples, the data that is presented to the system may be retrieved from archive records. The collected data 402 is pre-processed and cleaned at the collector module 404 using adaptive filter rules (block 104 of FIG. 2). As part of the pre-processing and cleaning process, a noise removal module 406 removes noise and a standardisation module 408 standardises the data. The pre-processed and cleaned data is stored in database 414 and is processed by an anomaly processing module 410 and a pattern recognition module 412. The anomaly processing module 410 is comparable to the profiler module 14 and detector module 16 described above and performs the process on the data described with reference to blocks 106, 108, 110 and 112 of FIG. 2. The profiler module 14, detector module 16, and any other anomaly processing modules may communicate directly with each other in order to improve performance of the system.

When the anomaly processing module 410 detects an anomaly (as described above) in one or more of the data streams, the pattern recognition module 412 analyses the data relating to that anomaly in order to uniquely classify the anomaly. For example, the pattern recognition module 412 may analyse the shape of the deviation function produced for the data in the data streams, the order or sequence in which events occur in the data or data streams, or any other information that will allow an anomaly to be classified. Thus, one particular type of recurring anomaly might cause particular changes in the parameter values in a first subset of the data streams during one or more time intervals, while another type of recurring anomaly might cause changes in the parameter values in a different second subset of the data streams during one or more time intervals. Similarly, while one particular type of recurring anomaly might cause a first set of changes in the parameter values in a particular subset of the data streams during one or more time intervals, another type of recurring anomaly might cause a different set of changes in the parameter values in that same subset of the data streams during one or more time intervals. Thus, events to be detected will produce a pattern of parameter value changes in particular data streams. Each pattern of parameter values may extend over multiple time intervals. The process of classification of an anomaly involves recognising the pattern of parameter value changes that is characteristic of the specific type of anomaly. This pattern may contain a sequence of multiple parameter values in one data stream, or may contain respective sequences of multiple parameter values in respective data streams.

This classification process may involve creating a 'fingerprint' of an event, which may take the form of a histogram of the classifications of events in an anomalous sequence. The fingerprint may be weighted, for example, showing the relative proportions of each event type in the anomalous sequence. The fingerprint provided by the pattern recognition module 412 and the information obtained by the anomaly processing module 410 (such as the deviation function or waveform) may be compared to a database of known and previously detected anomalies.

This combined data creates unique classification criteria for different anomaly types, which may be evaluated by an Artificial Intelligence (AI) engine. Dynamic time warping (DTW) algorithms may be used to compare the data from any newly observed anomalies to known (i.e. previously classified) and unknown previously discovered anomaly data. The algorithm may be used to compute the similarity between data obtained for two anomalies.

The measure of similarity between a new anomaly and a previously evaluated anomaly is also known as the divergence between the two anomalies. This is a configurable parameter and can be expressed as a percentage. Two anomalies under evaluation are considered similar or the same if the divergence is less than a divergence threshold set by an operator. The divergence threshold may be adjusted to minimise false positives and maximise effectiveness of the recognition process.

As different anomalies are detected over time, a histogram of the detected anomaly types can be plotted, which can be sorted by total number of occurrences for ease of reference. It is also possible to sort anomalies based on the cumulative severity, source (i.e. root cause of the anomaly), facility, etc. This information can be useful in security planning and/or may aid the operator to tune system parameters (such as the <if-then> enumeration rules and/or the deviation threshold) in order to improve the detection rate of the system.

During calibration of the system, each new anomaly may be compared to known data (which may be provided with the initial install of the apparatus or implemented through machine knowledge data packs, as mentioned earlier). Unknown anomalies are also recognised and displayed according to the number of occurrences. This allows an operator to analyse each occurrence of an anomaly previously detected, classify it and assign an action to it.

Figure 6:
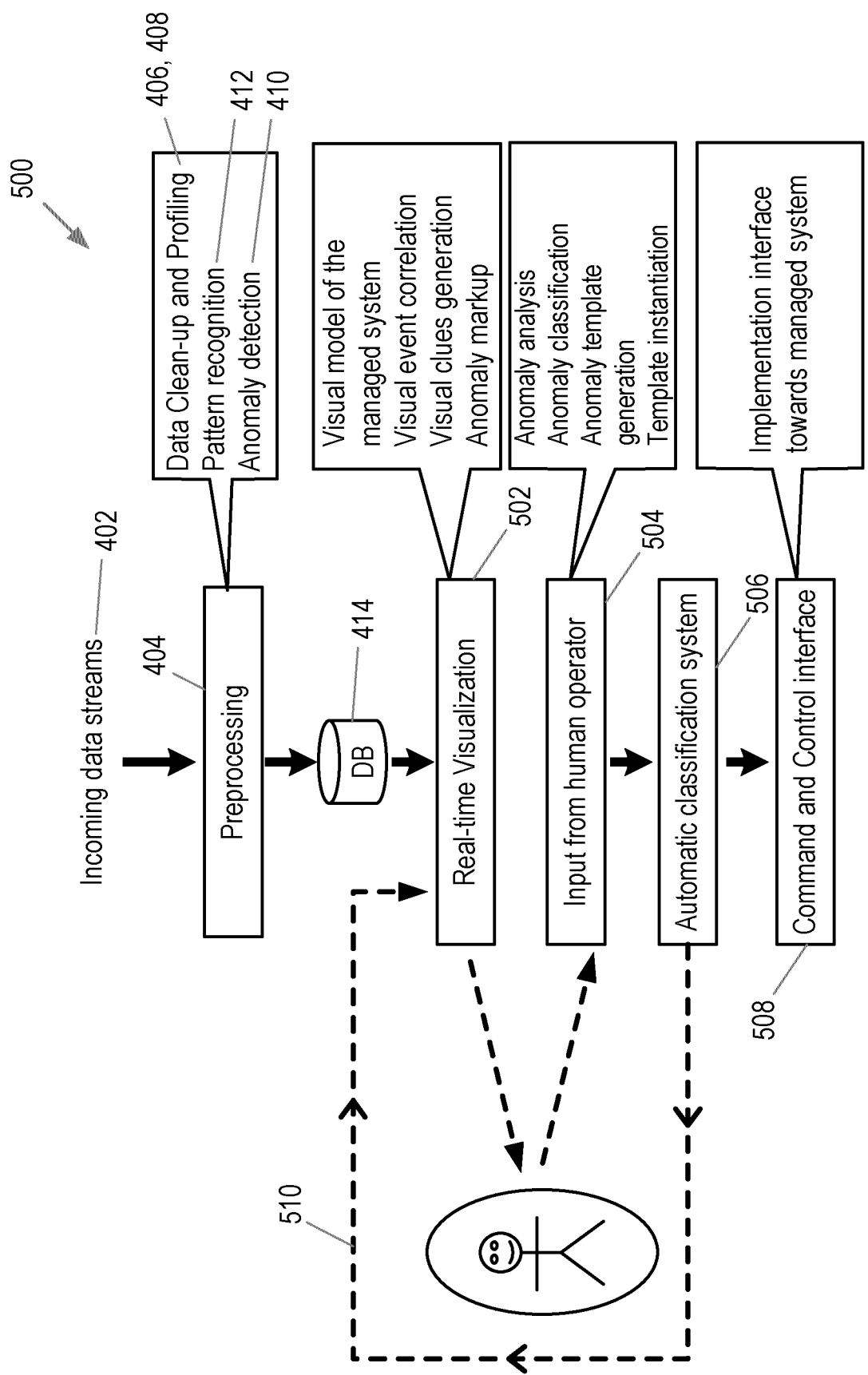
FIG. 6 is a block diagram illustrating another example system in which the invention may be implemented.

FIG. 6 is an illustration of a further aspect 500 of the system 400, which is operable by a user (or an operator). FIG. 6 illustrates the data 402 collected at a collector module, a pre-processing step (block 404), which includes the removal of noise by the removal module 406, the standardisation of the data by the standardisation module 408, the anomaly detection by the anomaly processing module 410, the pattern recognition by the pattern recognition module 412 and the storage of the data at the database 414. The system 500 shown in FIG. 6 also provides data visualisation tools that allow visualisation (for example, in real-time or near real-time) to a user or operator of the system (at block 502 of FIG. 6). Based on the visualisation, the user or operator of the system may then provide a user input (at block 504 of FIG. 6). The user input may include changing system parameters (such as the <if-then> rules or thresholds) according to their specialist knowledge and/or interpretation of the data from the data visualisation tools.

In one example, if an unknown (i.e. new type of) anomaly occurs frequently or has a high cumulative severity, the operator may identify top sources of high impact events and may address them one by one. For example, if the unknown anomaly is a new cyber attack producing significant deviations from expected values or having a noticeable impact on the system, which may be expressed via arriving log messages to the operator, the operator will see such anomalies high on the list in anomaly dashboard. Then, analysis may be performed on all such events. For example, the underlying data may be analysed and verified by the operator. Based on the analysis by the operator, the new anomaly may be classified at accordingly to its impact (at block 506 of FIG. 6). The anomaly may also be designated with a name and description. The action script may be assigned at this stage. In the case of the example of a new cyber attack, the mitigation script may act to neutralise the source of the attack and to protect the victim of the attack automatically. A notification regarding the detected anomaly may be sent to the system from which the data was collected by the command and control interface (at block 508 of FIG. 6).

The system 500 may include a loop 510, which represents optimisation of information that may be provided to an operator via a display, based on the cause of detected events. Examples of providing optimisation information to an operator may include displaying auxiliary help information, de-cluttering the display view, providing a pop-up including a checklist, operating procedures, feedback and/or warnings.

Figure 7:
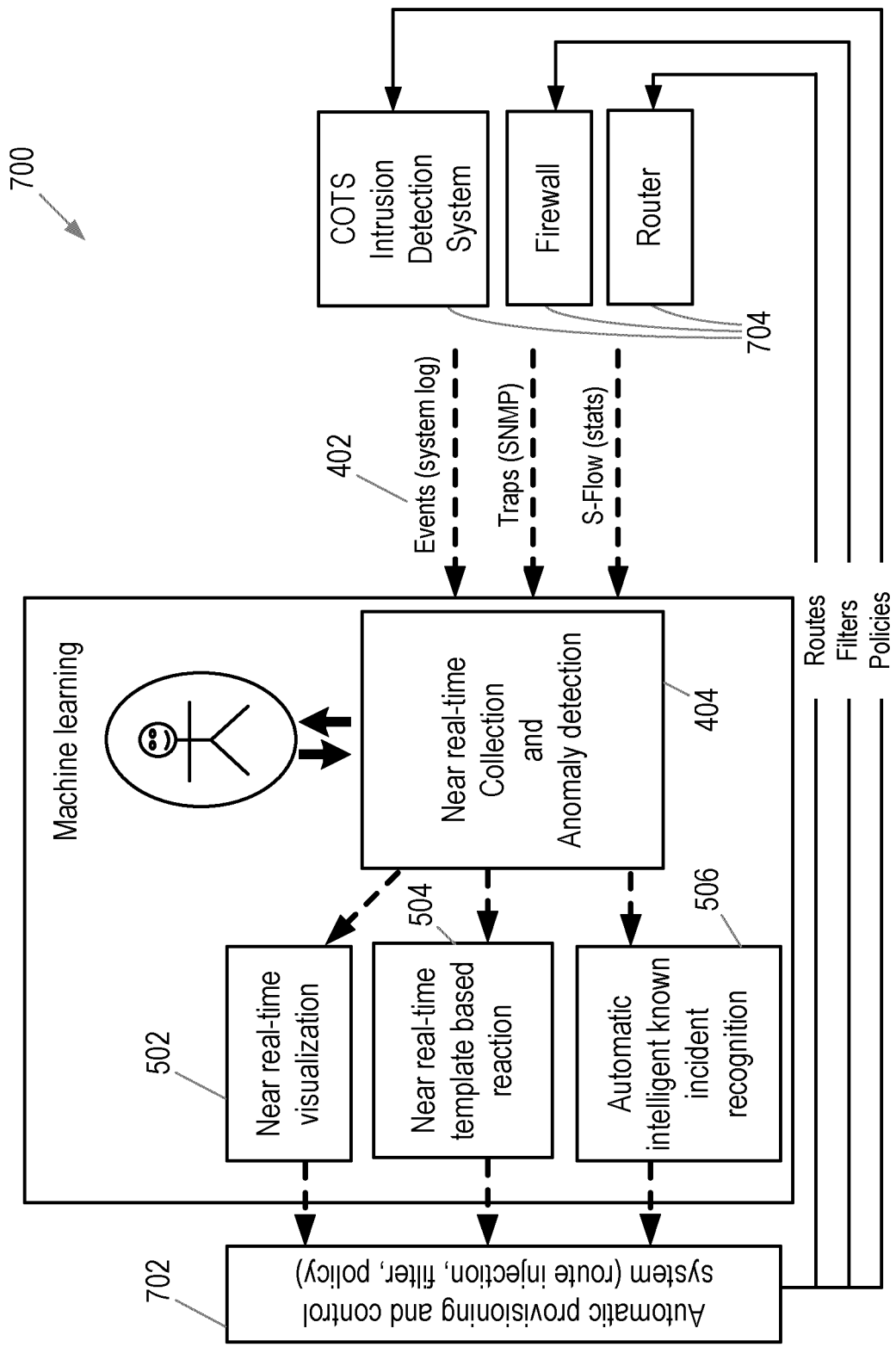
FIG. 7 is a block diagram illustrating an example system whereby an operator may be used to train a system using machine learning.

FIG. 7 is an example of a system 700 in which an operator can be used to train the machine-learning algorithm to detect and prevent anomalies by manually picking out anomalous sequences from the event flow and providing them as example anomalies to a machine-learning algorithm.

The data 402 collected at a collector module is received by the apparatus and is pre-processed (block 404), as described above with reference to FIG. 6. The data may be, for example, events and data values are collected from Commercial Off-the-shelf (COTS) third party devices and sensors via standard protocols (such as syslog, SNMP traps, s-Flow®, ASCII files, or the like). The system 700 then operates according to blocks 502, 504 and 506 of FIG. 6, as described above.

At block 702 of FIG. 7, custom action scripts and/or policies are triggered. The action scripts and policies may be developed for specific hardware and may be stored in a database with machine-learning data packs. The action scripts produce device configuration fragments, which are pushed to one or more managed devices or systems 704 (which include the device or system from which the data was collected and may also include other devices or systems such as a firewall, a router, or the like).

The action scripts and policies may, for example, perform various tasks. In one example, the action scripts and policies may isolate the malicious host source of brute-force password pickup attempts by deploying access list filters, which discard or reject IP packets arriving from the malicious host source IP addresses. In another example, the action scripts and policies may mitigate complex network infiltration attempts arriving from malicious host source IP addresses. In another example, the action scripts and policies may suppress sources of dDoS attacks in real time. Although examples are provided, it will be understood that the action scripts and policies may perform any other tasks.

The present invention is capable of recognising and counteracting many forms of anomaly causes including cyber threats. One example is the prevention of infiltration and unauthorised access. In this example, when a malicious cyber-agent commences the infiltration or unauthorised access attempt, it produces a distinct pattern in the firewall logs, intrusion detection logs, system access logs, authentication logs. Malicious actions are typically automated and scripted. Combined, profiled and analysed, in the manner described above, these events produce a distinct event landscape that can be registered as an anomalous waveform of the deviation function. This waveform is analysed and compared to the known set of incidents. If a match is found, passive measures may be deployed. For example, a firewall filter (which blocks access from the abusing Internet Protocol (IP) address) may be deployed to block the source of the attack, for example, for a predetermined amount of time and an operator of the system may be notified. In another example, a routing policy may be deployed to redirect malicious traffic for recordal, analysis and processing.

Another example is the prevention of Distributed Denial of Service (dDOS) attacks. In this example, when a malicious cyber-agent creates a surge of the activity that matches a distinct and known pattern, the system may deploy passive and active countermeasures. For example, a firewall filter (which blocks access from the abusing Internet Protocol (IP) address) may be deployed to block the source of the attack, for example, for a predetermined amount of time and an operator of the system may be notified. In another example, a filter based routing policy may be deployed to redirect malicious traffic back to the source of the attack. The source of the attack may be actively suppressed through congestion such as by implementing bottlenecks to cause deliberate congestion on the segments. In another example, a host route may be injected into an interior routing protocol via a physical/logical/tunnel interface to routers at the border between a protected and unprotected domain. The routers may have reverse path forwarding checks in place such that all traffic from malicious sources is discarded at the edge of the protected domain. In one example, the edge of the protected domain may be extended by an exterior routing protocols (such as the Border Gateway Protocol, BGP) to the sources of the malicious traffic.

Therefore, the invention advantageously provides an improved method of detecting an anomaly in a data stream.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An anomaly detection method comprising:
    receiving in memory of a computing system, a data stream of data;
    segmenting the data stream into different time intervals and computing one or more values for one or more respective sequences of events detected in the data stream of data for each of the time intervals in a corresponding segment, the computing comprising, for each one of the sequence of events, mapping a keyword contained therein to a specific severity value so as to produce a data series of severity values defining a graphically plottable stochastic severity function;
    comparing each computed one of the severity values in the corresponding segment to an expected value for the corresponding segment comprising a median value for all data in the corresponding segment in order to determine a deviation value for the corresponding segment; and,
    declaring an anomalous condition for the corresponding segment, computing a deviation function of a sequence of deviations determined in respect to the data stream, classifying the anomalous condition by comparing the sequence of deviations to different fingerprint sequences pre-stored in a data store, the fingerprint sequences each classifying a different respective anomaly through pattern recognition, in order to locate a similar one of the fingerprint sequences within a threshold value and applying a classification of the similar one of the fingerprint sequences to the sequence of deviations and assigning an action in the computer in response to the anomalous condition pre-associated with applied classification, the action assigned when the deviation value exceeds a threshold value for the corresponding segment.

2. The method of claim 1, further comprising defining each of the time intervals as a function of a duration of time during which sequences of events are to be collected in order to produce a continuous or discrete function representing a sequence of events, and a radius of time, denoting if the anomalous condition may be declared within this radius of time.

3. The method of claim 1, wherein the deviation function is a plot of a histogram of the deviations visually characterized by a unique shape and each of the fingerprint sequences are individual histograms each having a unique shape, the comparison of the sequence of deviations to the different fingerprint sequences pre-stored in a data store comprising a comparison of the unique shape of the histogram of the deviations to each different histogram of the fingerprint sequences so as to locate one of the fingerprint sequences with an associated histogram of similar shape as the histogram of the deviations.

4. The method of claim 1, further comprising, when none of the fingerprint sequences in the data store are determined to be similar to the deviation function, adding the deviation function to the data store as a new one of the fingerprint sequences and associating the new one of the fingerprint sequences with an unknown classification.

5. An anomaly detection system comprising:
    a computing system comprising a computer with memory and at least one processor; and,
    an anomaly detector comprising computer program instructions executing in the memory of the computer during which execution the anomaly detector performs:
        receiving in the memory of the computer, a data stream of data;
        segmenting the data stream into different time intervals and computing one or more values for one or more respective sequences of events detected in the data stream of data for each of the time intervals in a corresponding segment, the computing comprising, for each one of the sequence of events, mapping a keyword contained therein to a specific severity value so as to produce a data series of severity values defining a graphically plottable stochastic severity function;
        comparing each computed one of the severity values in the corresponding segment to an expected value for the corresponding segment comprising a median value for all data in the corresponding segment in order to determine a deviation value for the corresponding segment; and,
        declaring an anomalous condition for the corresponding segment, computing a deviation function of a sequence of deviations determined in respect to the data stream, classifying the anomalous condition by comparing the sequence of deviations to different fingerprint sequences pre-stored in a data store, the fingerprint sequences each classifying a different respective anomaly through pattern recognition, in order to locate a similar one of the fingerprint sequences within a threshold value and applying a classification of the similar one of the fingerprint sequences to the sequence of deviations and assigning an action in the computer in response to the anomalous condition pre-associated with applied classification, the action assigned when the deviation value exceeds a threshold value for the corresponding segment.

6. The anomaly detection system of claim 5, wherein the anomaly detector further performs defining each of the time intervals as a function of a duration of time during which sequences of events are to be collected in order to produce a continuous or discrete function representing a sequence of events, and a radius of time, denoting if the anomalous condition may be declared within this radius of time.

7. The anomaly detection system of claim 5, wherein the deviation function is a plot of a histogram of the deviations visually characterized by a unique shape and each of the fingerprint sequences are individual histograms each having a unique shape, the comparison of the sequence of deviations to the different fingerprint sequences pre-stored in a data store comprising a comparison of the unique shape of the histogram of the deviations to each different histogram of the fingerprint sequences so as to locate one of the fingerprint sequences with an associated histogram of similar shape as the histogram of the deviations.

8. The anomaly detection system of claim 5, wherein the anomaly detector further performs, when none of the fingerprint sequences in the data store are determined to be similar to the deviation function, adding the deviation function to the data store as a new one of the fingerprint sequences and associating the new one of the fingerprint sequences with an unknown classification.

\* \* \* \* \*